Patented Feb. 6, 1951

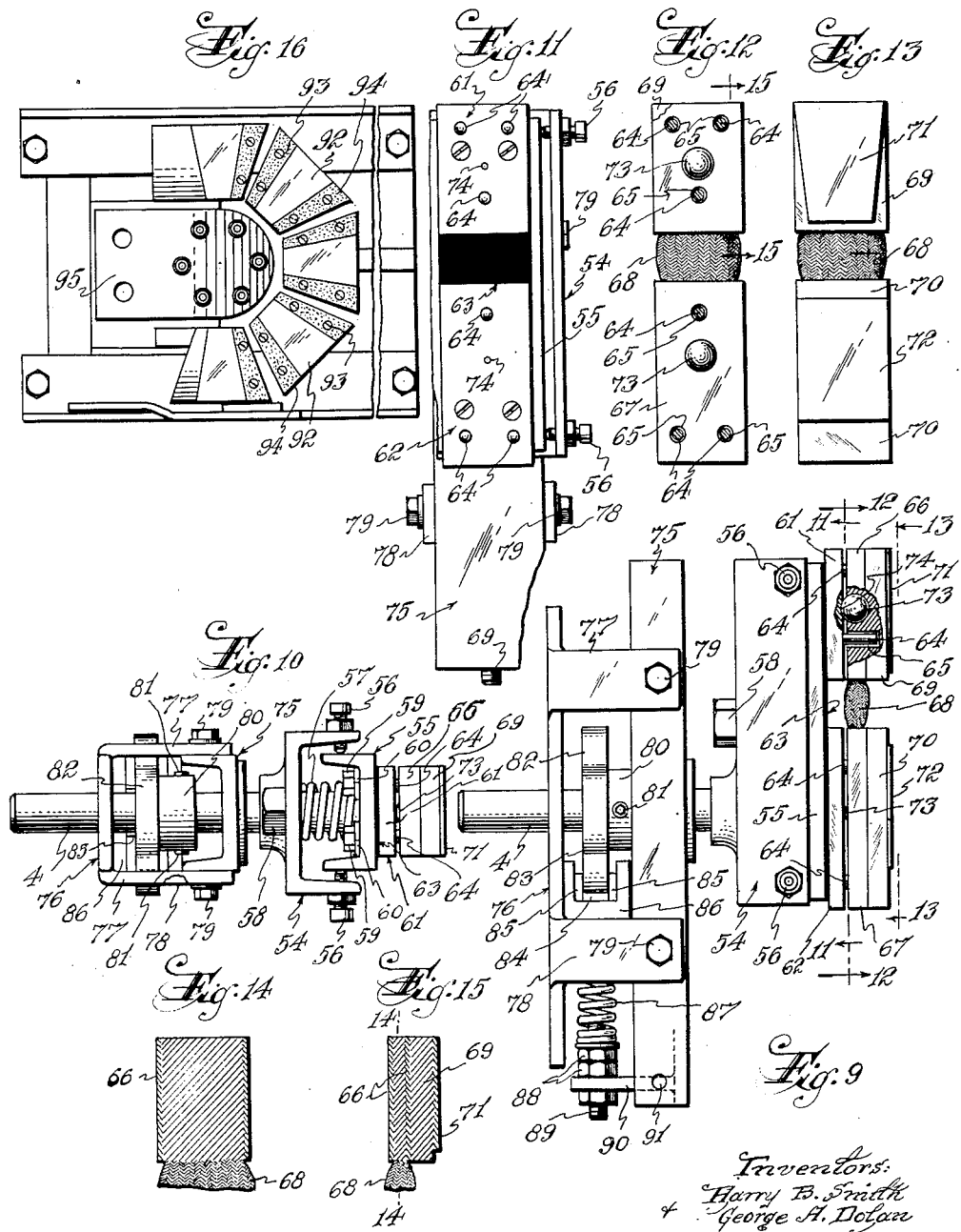

2,540,219

UNITED STATES PATENT OFFICE 2,540,219

MEANS FOR HEAT-TREATING AND WELDING METAL PARTS

Harry B. Smith, Narberth, Pa., and George A. Dolan, East Orange, N. J.

Application December 19, 1946, Serial No. 717,172

33 Claims. (Cl. 219—10)

This invention relates to an improved process for uniting together metallic parts or members such as pipes in which case the steps of preheating, arc welding and normalizing or stress relieving are involved although the process to be described herein may be utilized only for heating and stress relieving.

In our Patent 2,184,534 issued December 26, 1939 we have shown and described means for carrying out these steps.

We have found from practical experience and study of the problems involved that our early method or process of treating metallic members can be greatly improved in a manner to be hereinafter described.

In using only one coil on each side of the weld area as set forth in our patent just referred to, the flux is at maximum at the weld and prevents the welder from working as he should. Consequently, it was found necessary to raise the weld area temperature several hundred degrees beyond a certain specified point, then deenergize the coils to permit welding at the joint. Then when the weld area cooled to a specified minimum, the welding operation had to be stopped until the temperature of the weld area was again raised. In the case of main high pressure steam lines and other heavy wall thickness metals, several days were required for the complete welding operation. In our new method to be described, preheating can be maintained from the beginning of the welding operation to its finish with the metal never being permitted to cool until the welding has been stress relieved, the temperature being maintained automatically within specified limits.

Today, welding specifications require the preheating temperatures of approximately 600° F. for carbon molybdenum and chrome molybdenum piping to be maintained continuously from the time the welding operation starts until it is completed, and then, without allowing the metal to cool, the temperature must be raised to approximately 1300° F. in the case of carbon molybdenum, or approximately 1400° F. to 1500° F. if the metal is chrome molybdenum. The temperature rise is also specified to be at a certain rate per hour, depending on the wall thickness of the metal. The temperature of 1300° or 1400° must be held for a specified time and then lowered at a rate usually lower than that required in raising. The present-day welding specifications also usually state that the area to be heated shall be six times the wall thickness of the metal on each side of the weld and that a specified holding temperature shall be within 25° F. over the entire specified heated area.

In order to meet these specifications, it is necessary to have means for determining the temperature at and adjacent the weld area. In the case of a chrome molybdenum pipe that is 2 inches thick and 16 inches O. D. and lying in a horizontal position, the area to be treated will be 24 inches long, thermo-couples being placed on the weld and at 6 and 12 inches each side of it, both at the top and bottom of the pipe, thus requiring ten thermo-couples which are connected to a multi-point pyrometer recorder in order to provide a permanent record and proof that the specified heat treatment has been applied properly to the metal during the various steps in the process, especially the stress-relieving cycle. In addition, the thermo-couples are placed four inches on either side of the weld and connected to a controlling pyrometer for the purpose of maintaining the specified preheating temperature during the welding operation.

Pipes running horizontally are subjected to temperature differentials due to horizontal and vertical convections. The horizontal convection is caused by large bodies of metal, such as valves or boiler drums, which radiate heat faster on one side of the weld. We have found that in the use of our old system that the temperature between the top and bottom of the pipe could be kept fairly uniform by placing 1½ or 2-inch thick Transite or ceramic strips under the top half of the induction windings, thus producing an increase in power output in the bottom over the top half of the pipe. However, we have found that this method can only be used by experts as the thickness of the strips used is dependent on the diameter of the pipe; for example, previous experience indicates a normal temperature differential of 32° F. between the top and bottom of an 8-inch pipe of standard wall thickness, 50° F. for a one-inch wall thickness, and 80° F. for a two-inch wall thickness; while a sixteen-inch pipe having a two-inch wall thickness will have a difference of 100 or more degrees unless special means are provided to take care of it. In the case of pipes running vertically, a large temperature differential exists due to convection, and the proximity of large masses of metal to the weld, requiring a means of increasing power input to the colder section or power decrease to the hotter section.

We have further found by tests that in heat-treating a metallic member with a single winding or coil, unless a certain pitch to the turns is used, a uniform temperature will not be maintained as the area directly under the center of the winding will be much hotter than at either end; hence, to maintain an absolutely uniform heat band, it is necessary to place the turns of the coil closer together at each end and gradually increase the spacing with a maximum distance between the turns on each side of the center of the coil.

In a case of non-uniform radiation, it is customary to place a large number of turns in the coil on the colder side of the weld and increase the power output at that point. This is very difficult to do as the coldest area is usually adjacent the valve or other fitting, and the space available for the additional turns is very small, and in a great many cases in order to accommodate sufficient turns to compensate for the thermal losses, it has been customary to use a small copper tube insulated with asbestos sleeving to pass water through the tube. While this accomplishes the purpose, the heat and electrical losses are too large and the labor high; besides, water supply and discharge lines are necessary and too much depends on the judgment of the operator to obtain proper results. Revisions in the winding are difficult to make as errors do not appear until the metal approaches the maximum temperature, at which time the metal is too hot to permit a coil revision. For this work and as specified in our patent previously referred to, transformers are used varying in capacity from 20 to 120 kva, or larger, and weighing from 1250 to 4500 pounds or more. Such structures are large and heavy and are costly to handle. Besides, it has been necessary in the past to operate them at a considerable distance from the work, due to size and weight, resulting in substantial electrical losses in the secondary cables. Furthermore, the working spaces around the boilers in power stations and other places such as on ships are greatly limited, and the platforms at the various elevations are too light to support the concentrated weight of such large transformers, and their size and capacities must therefore be increased to take care of the losses in the secondary cables. In the construction of a power station, the pipe to be treated varies in size from the smallest (¾ of an inch) to a 34-inch boiler "downcomer" of 2-inch wall thickness, according to present practice, which means that the transformers operative for this work must be large enough in capacity to take care of the largest pipe or structure to be treated, as well as the smallest.

The primary object of our present invention is to overcome these difficulties, and to do this we have evolved a system in which a relatively small light transformer is utilized having sufficient capacity to completely heat treat welds on pipes of from ¾ to 6 inches in diameter which range includes the greatest number of pipes.

A further object is to provide a short and small construction whereby they may be readily carried into small spaces and easily banked and connected to treat the pipes in this limited space.

A further object of our invention is to provide a small transformer of such a design that it can be readily banked and connected to take care of heat treatment of the larger pipe sizes.

A further object of our invention is to provide relatively simple and positive means of obtaining uniform temperatures within the specified area to be heat treated.

A still further object of our invention is to provide a relatively small, light weight unitary structure which the heating transformer, switches and other control devices are an integral part and are arranged so that these structures may be readily interconnected to meet the requirements of the work to be performed. These and other objects will be discerned by one familiar with the nature of the work for which the apparatus to be described in detail is designed.

The accompanying drawings show diagrammatically certain of the important features of our improved and latest method of providing closer control of stress-relieving temperatures at the weld area on high-pressure steam pipe lines. The drawings also disclose a method of providing the necessary transformer capacity by using units in which load or work transformers are utilized of a size and weight such that the unit can be easily transported to the work and then connected by means of plugs to form a bank or complete assembly of any capacity required.

Figure 3a is an enlarged view of one of the parts showing how the bottom unit is held off the floor.

Figure 3b is a view on line 3b—3b of Figure 3 showing how the locking parts extend from one unit down over its supporting unit.

Figure 7 is a diagram showing the manner of applying the temperature-regulating windings illustrated in Figures 3 and 6.

Figure 8 illustrates the manner in which the main heating coils should be placed on a pipe or pieces of metal to be heat-treated by a single coil.

Figure 9 is a side view of the moving parts of our preferred form of tap-changing switch including the means for preventing the stopping of the switch between tap contacts. This is somewhat different from the form shown in Figures 1 and 2.

Figure 10 is a top plan view of Figure 9.
Figure 11 is a view on line 11—11 of Figure 9.
Figure 12 is a view on line 12—12 of Figure 9.
Figure 13 is a view on line 13—13 of Figure 9.
Figure 14 is a view on line 14—14 of Figure 15.
Figure 15 is a view on line 15—15 of Figure 12.
Figure 16 is a plan view of the stationary part of the tap changing switch.

Figure 1:
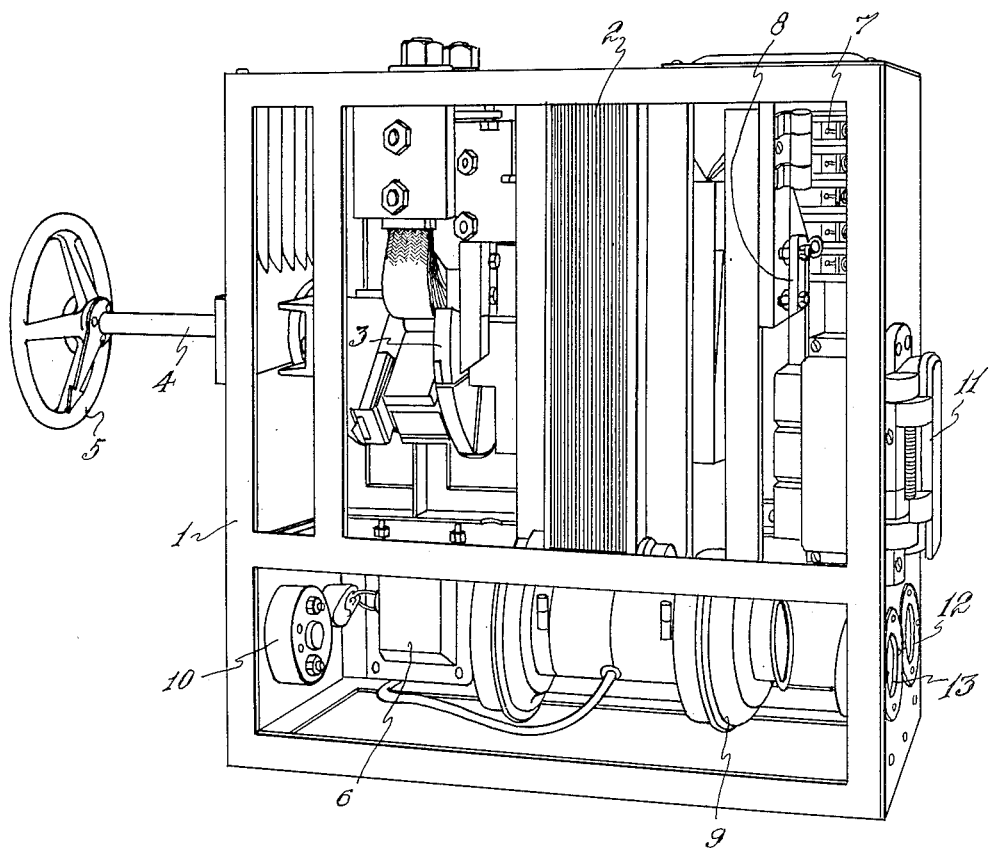
Figure 1 is a top view, at a slight angle, of one of the unitary structures which may be used individually or in combination with similar units, the top of the casing being removed to show certain of the parts making up the unit.
Figure 2:
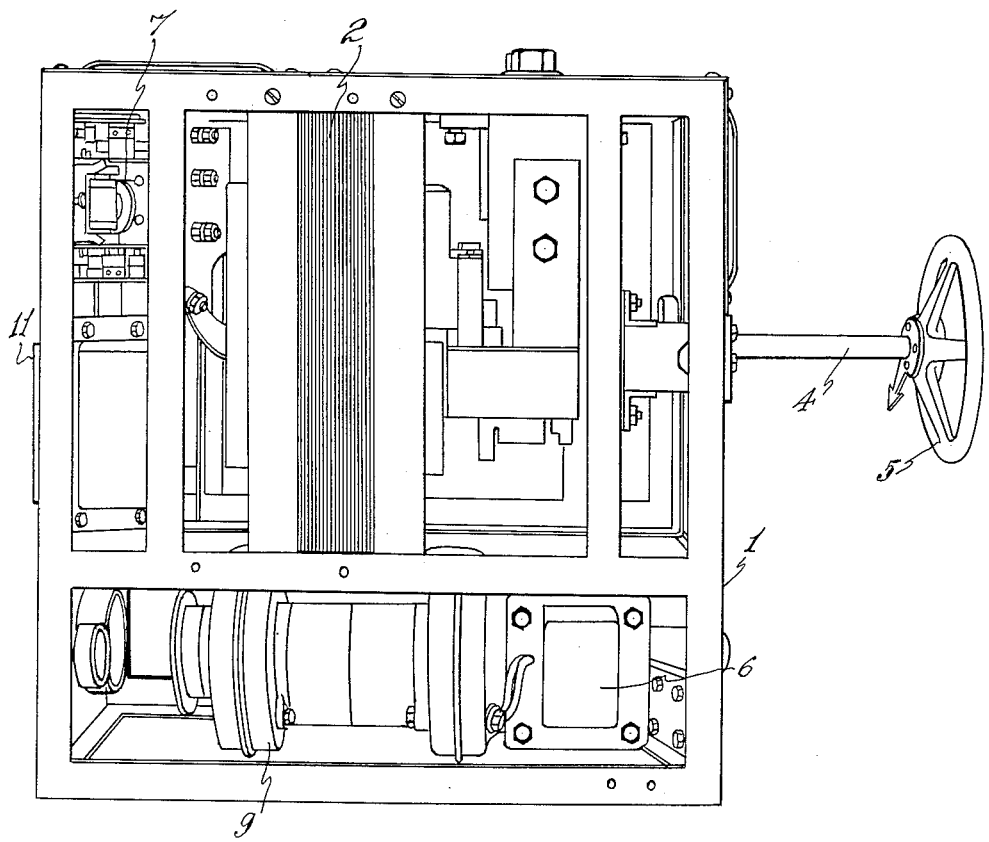
Figure 2 is a view of the unit shown in Figure 1, but taken from the opposite direction.

In the drawings, where like numerals refer to corresponding parts, each power unit as shown in Figures 1 and 2 includes a plurality of elements assembled within a housing or casing in such a manner that while the unit per se may be utilized where only a small amount of power is necessary, the units may be quickly assembled into a complete structure having a power output sufficient to take care of the greatest requirement.

Each unit is made up of a housing or casing 1 within which is mounted a load or work transformer 2. Preferably the transformer 2 is of the shell type, with its secondary turns tapped and these taps brought out to the segments of a dial switch 3, the same being operated by the shaft 4 and handle 5. This dial switch provides regulation from two to ten volts which range is not however to be taken as a limit. The switch segments are constructed in such a manner as to prevent open or short circuits as the moving contact passes between taps as will be later explained. Means are also provided to prevent stopping of the moving contact at any point between taps, to which reference will also be later made.

Within the casing 1 is also mounted a small control transformer 6, a contactor 7, a link board 8, a blower 9 for cooling the apparatus, especially the load transformer, an ammeter 10 and numerous other parts to be later referred to. On the outside of the casing is mounted the power receptacle 11, a four-pole twist lock flush receptacle 12 and a three-pole receptacle 13.

The casing, which is preferably made of sheet aluminum, is also provided with grommet-type openings such as 12 to receive a cable terminating in a four pole twist lock plug that is adapted to go into a socket 12 in another unit to which reference will be later made.

Figure 5:
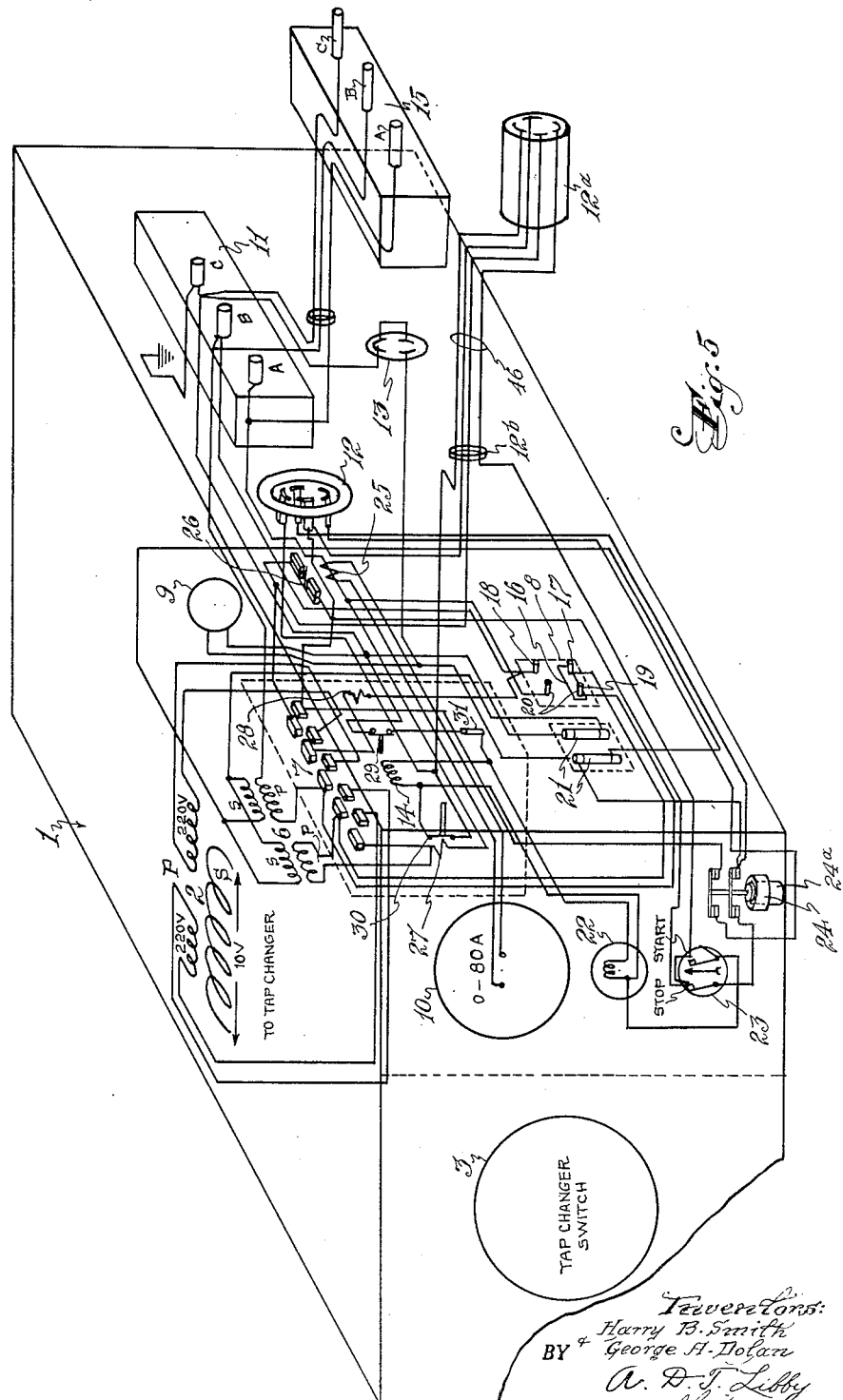
Figure 5 is a perspective schematic view of one the units showing certain of the interior wiring of the power transformer primary and control wiring.

In Figure 5 are illustrated diagrammatically some of the parts shown in Figures 1 and 2, and the electrical connections therebetween; for example, the power or load transformer 2 has a primary P composed of windings which may be connected in parallel for 220-volt operation, or in series for 440-volt operation through the link board 8. The secondary S has an output voltage of approximately ten, and the turns of this secondary winding are connected to the segments or contacts of a dial switch or tap changer 3 as better illustrated in Figure 6.

Figure 6:
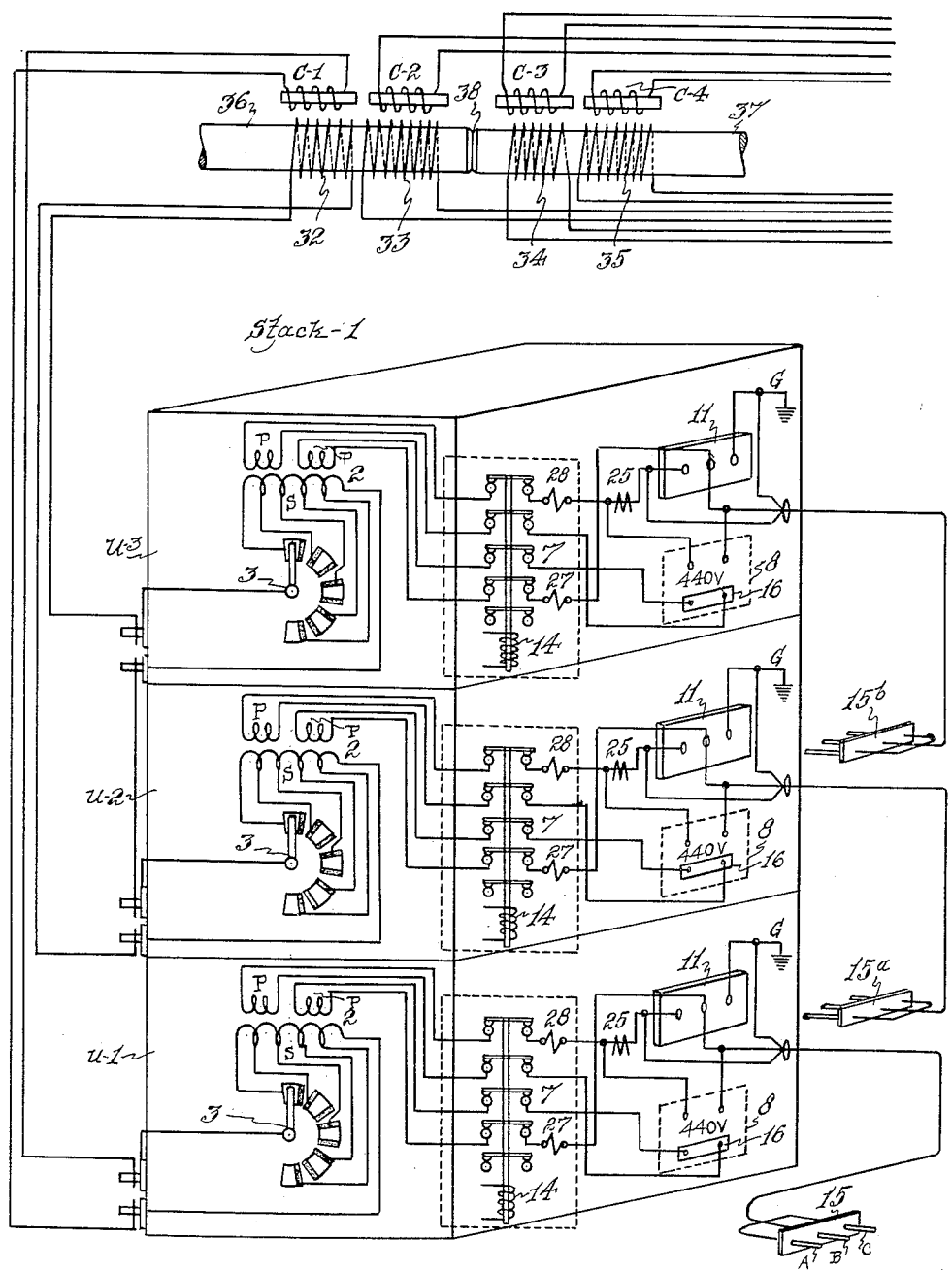
Figure 6 is a perspective schematic view of three of the units shown in Figure 5 in assembled position as shown in Figure 4, showing certain of the interior wiring such as the main transformer, secondary tap-changing switch as connected to heating windings on a pipe.

The contactor 7 is electrically operated by a coil 14 (see Figure 6) so that when the coil 14 is energized, the various contacts, generally referred to by the numeral 7, are closed as shown in Figure 6, thereby passing current through the primary windings P. A plug 15, having contact members A, B and C is utilized for making connection to a single-phase alternating current source of supply, it being understood that the terminal C and cable connected thereto is a ground conductor and is also connected at G to the casing of the unit.

The link board 8 is provided with four studs and a pair of links, only one of which, 16, is shown in Figure 5, is utilized to connect the primaries of the power transformer 2 and the control transformer 6 in series or parallel relationship for service from 220 to 440-volt circuits. When two links are used, the links are in a vertical position to connect studs 17 and 18 together, and studs 19 and 20 for 220-volt operation. Where one link 8 is utilized, as shown in Figure 5, the two primary windings on the power transformer 2 and the control transformer 6 are connected in series for 440-volt supply power. Fuses 21 are utilized in the circuit of the blower motor 9 and the secondaries of the control transformer 6. A red lamp 22 is connected across the contactor coil 14 to indicate its position of operation. A stop-and-start switch 23 is utilized for putting the unit into operation.

A switch 24 is incorporated in the bottom of each unit. The contacts of this switch are normally closed as indicated in Figure 5 on the bottom unit when this unit is placed on the floor since the angularly shaped legs 52 at each corner rest on the floor and hold the switch plunger out of contact with the floor, whereas in the case of the units U2 and U3 the switch 24 is positioned so that the plunger 24a of the switch engages the top of the unit on which each rests and hence the contacts are opened, it being understood that the legs 52 are positioned on the outer surfaces of the units so as to fit down over a unit on which it may be placed.

The ammeter 10 is provided with current from the current transformer 25. A switch 26 has its contacts normally closed as indicated in Figure 5, but they are opened when a four-point plug 12a, to which reference will be later made, is inserted into the receptacle 12 to which reference will also be later made. Thermostatic heaters 27 and 28 are utilized to protect the apparatus in case of continuous overload by opening the reset contact 29 and 30 which would deenergize the contactor coil 14, thus cutting off current from the power and control transformers of all units in the stack. This control circuit is protected by a fuse 31.

Figure 3:
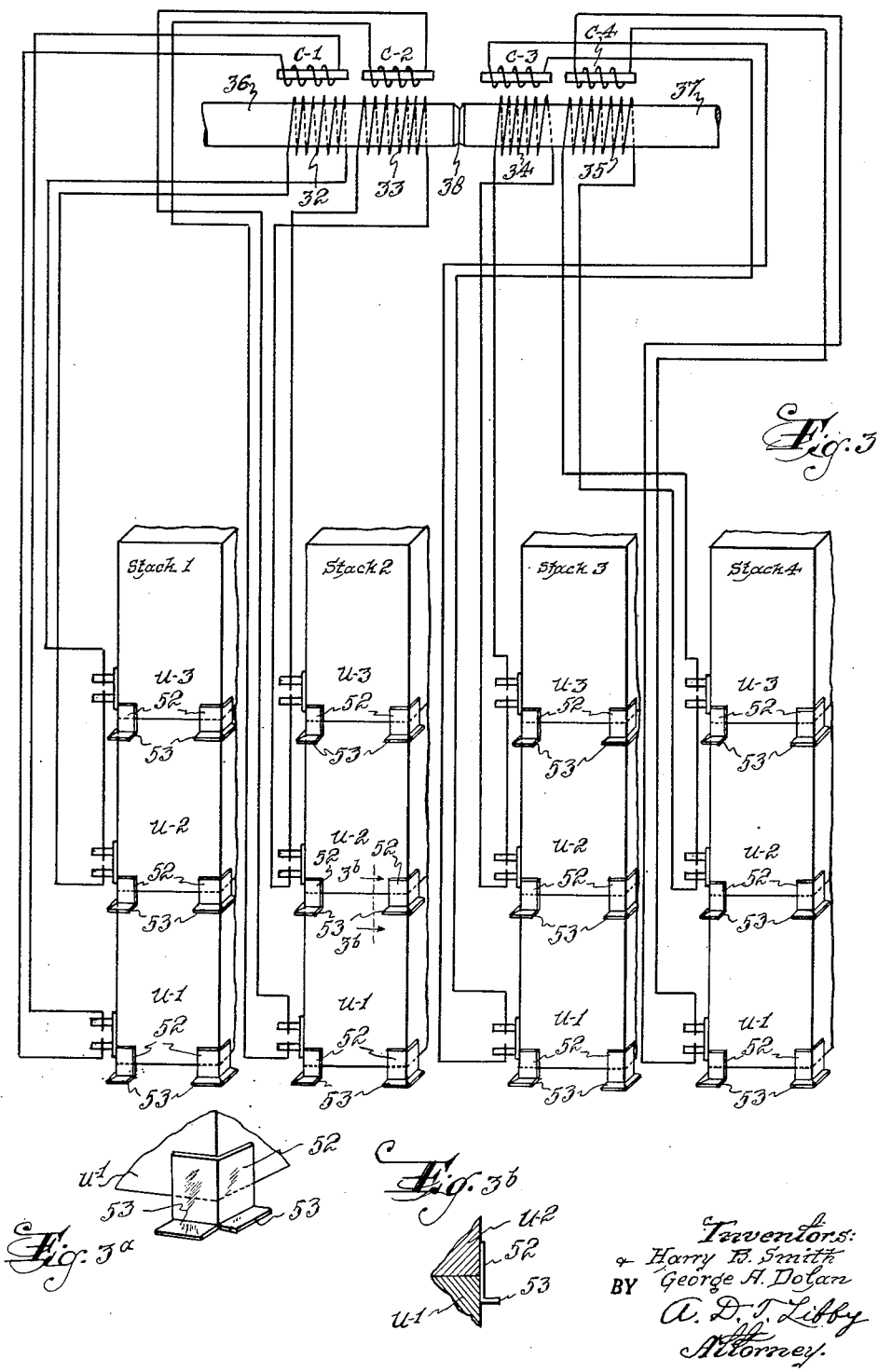
Figure 3 is a diagrammatic view showing how the units are combined for use in heat-treating a pipe for welding, the stacks of units illustrating the interlocking parts for holding them together.

Referring to Figures 3 and 6, it will be seen that the secondary of the power transformer 2 of the bottom unit U1 is connected by way of the control switch 3 to a regulating coil C1 that is associated with a winding 32. It will also be seen from Figure 6, that the secondaries of the units U2 and U3 are connected in series with the winding 32. Similarly, the power transformers of the units of stack 2 are connected to a regulating coil C2 and a winding 33. Also, the units of the stack 3 are connected to coils C3 and winding 34; and the units of stack 4 are connected to coil C4 and winding 35. The windings 32 and 33 are positioned on a member 36 that is positioned in abutting relationship to a member 37 to be welded thereto at 38.

It will be noted from Figures 3, 3a and 3b that the units U1, U2, U3 are held together by interlocks 52 at each of the bottom four corners. The parts 52 are angle pieces preferably having outwardly turned edges 53 to act as flange supports for any one of the units when it is used as the bottom one, in which case the bottom unit is held off the floor or support on which the unit may be placed. The flanged angles may be fastened to the units in any satisfactory manner as by welding and it will be seen from the Figures 3, 3a and 3b that since there is one of them at each bottom corner, the units will be held from any lateral shifting and its own weight will hold it in vertical position.

With the arrangement shown in Figure 3, maximum output is obtained which is necessary for large-size, thick-walled pipe or equivalent members that require large current for preheating and normalizing a weld after the same has been completed.

By reference to Fig. 6, it will be seen that electrical connection of supply power from the unit U1 to the unit U2 is made by means of a plug 15a, similar to the plug 15, and from the unit U2 to the unit U3 by a plug 15b, so that either one, two or three of the units may be utilized, depending on the size and characteristics of the pieces to be operated on. Where the members 36 and 37 are small, it may be necessary only to utilize the unit U1 on the member 36, and a corresponding unit on the member 37 with or without regulating coils C1—C4.

Concerning the regulating coils C1—C4, shown more in detail in Figure 7, it may be mentioned that in certain cases there is a temperature differential between the top and bottom of a pipe or pipe parts that are to be welded. Since these coils are only segments of a circle, they are preferably arcuately formed to fit over a part of one of the windings 32—35. If the coil C1 is placed over the lower half of its winding, say 32, a polarization takes place which will increase the available flux at that point and add heat to the bottom metal of the pipe. If it is placed over the top part of the pipe as illustrated in Figure 7, the current flow, as indicated by the arrows, will cause a polarization such as to decrease the flux at this point, thereby cooling the top of the pipe. With the arrangement disclosed, we have now found it possible to regulate the transformers and coils so as to bring the top and bottom temperatures of a pipe or pieces to be welded together within the 25 degrees now specified, as previously set forth.

Another improvement we have discovered is illustrated in Figure 8, wherein there is shown a bar of metal 36 to be heat treated by a single winding. In this arrangement that particular part of the bar requiring the treatment is located under the turns 40 that have a pitch which may be termed coarse while the opposite ends 39 and 41 have a finer pitch to supply more heat at these localities for conduction of this heat into the bar beyond the winding and thereby obtain a more uniform heating along the bar embraced by the winding. The use of these varying pitch windings for preheating and normalizing, together with regulating or polarizing coils, is especially advantageous in the treatment of long lengths of ship shafting and well-rods for relieving stresses therein especially at certain localities.

While the winding on the pipe 36, in Figure 8, is shown as being made of solid wire, it may be made up of hollow tubing through which cooling fluid such as water may be passed. When a pipe is used, we prefer to use a water relay W in connection therewith, the pipe being indicated by the letter P. When the water relay is used, this may be connected to the controller 42 by a cable 44 composed of three conductors. The purpose of the water relay is to open the contactor 7 should the cooling fluid supply be cut off, to thereby protect the windings, around the pipe or bar being treated, from being burned out.

When the controller 42 is not utilized, then the plug to which the three-conductor cable 44 is connected may be plugged into the unit U1, if only one unit is used; but if the complete stack of three units is being utilized, then the plug would be inserted into the receptacle 45 of any one of the units, this control circuit being a series one; hence the plug for the cable 44 may be inserted into any one of the sockets of the receptacles 45.

Figure 4:
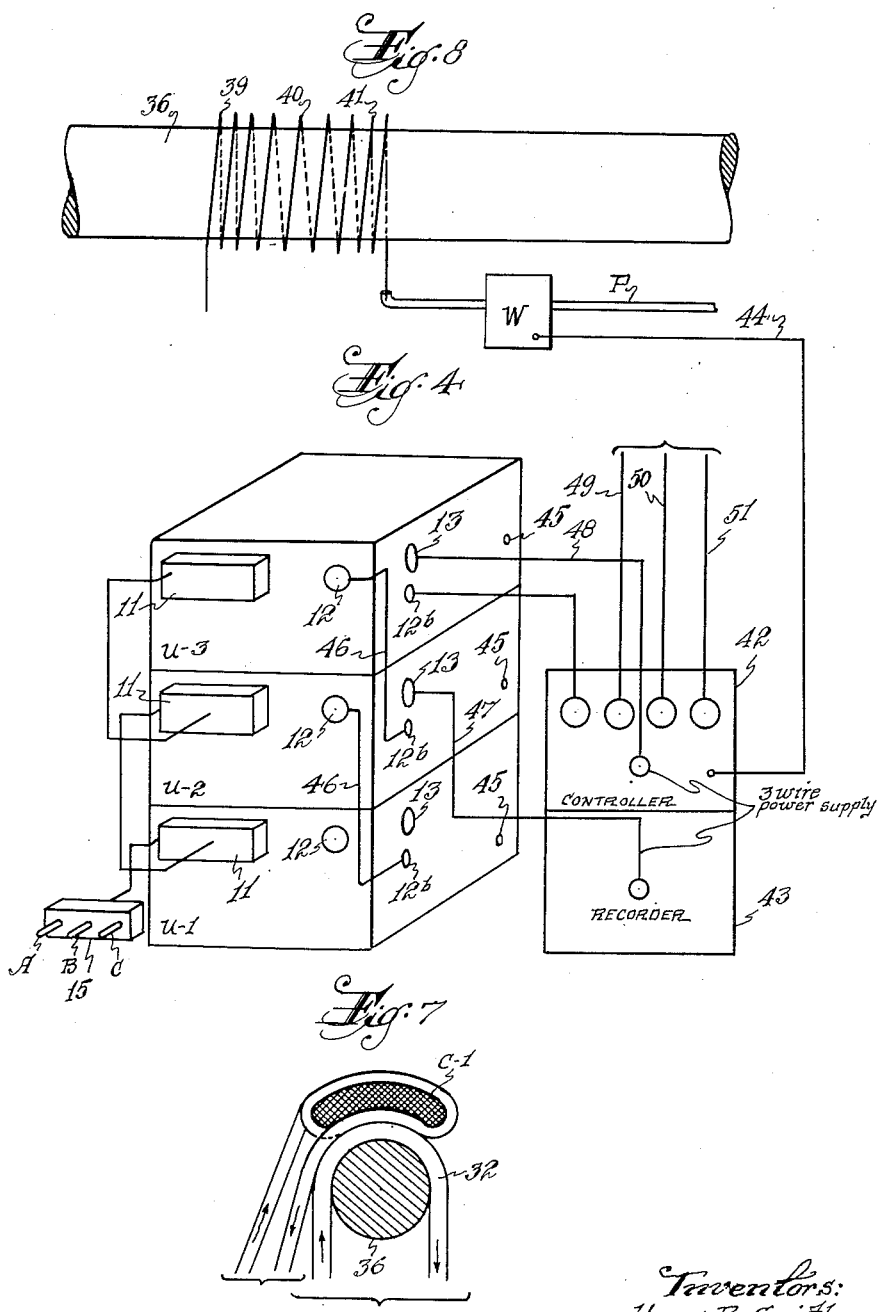
Figure 4 is a perspective view on a reduced scale showing three of the units arranged in working position to make up a complete power capacity assembly, together with recorder and controller units.

By placing the windings 32—35 and regulating coils C1—C4 when used in tandem relationship as illustrated in Figures 3 and 6, another important advantage is reached over the arrangement shown in our patent to which reference has been made, in that the windings and coils adjacent the weld area 38 may be readily deenergized after the preheating temperature is reached, which temperature can be maintained continuously by the more remote windings such as 32 and 35 and the heat generated at the arc during the welding operation, as the flux from these windings will not interfere with the welding arc.

Where completely automatic regulation is desired, the units U1—U3 of a stack may be connected to an automatic controller 42 and an automatic recorder 43 associated therewith, all as illustrated diagrammatically in Figure 4.

In this figure the bushings or grommets 12b (see Figure 5) are indicated with a cable 46 coming therefrom and terminating in a four-conductor plug 12a which is adapted to be inserted into the socket of the receptacle 12. Similarly, the receptacles 13 of Figure 5 are indicated as having cables 47 and 48 to which a plug is attached for insertion into the receptacle 13. The cable 47 has three conductors therein coming from the recorder 43. A cable 48, similar to 47, is adapted to connect the receptacle 13 of the upper unit U3 to the controller.

Extending from the controller, are three cables 49, 50 and 51 which are of the four-conductor type and are utilized to connect the controller with additional stacks of units as indicated in Figure 3. Since the circuits per se are not mechanical parts of our invention but are utilized merely for connecting the units together and to the controller and recorder, it does not seem necessary to describe the circuits in detail other than what has been shown and described for one of the units as illustrated in Figure 5.

In Figures 9 to 16 we have shown the preferred form of our tap switch. This is made up of movable parts shown in Figures 9 to 15 inclusive and a stationary part shown in Figure 16. The movable part is made up of two sections, one carrying switch contact and the other means for moving and controlling the position of the switch contact section, the latter of which is made up of two channel members 54 and 55 preferably of steel. The channel 55 is narrower than 54 and has its sides projecting within the confines of the wider channel 54. The channel 55 is adjustably positioned in the channel 54 by a plurality of adjustable screw studs 56. A spring 57 is positioned around a stud 58 that is fastened to the channel 54 but which slidably carries the channel 55. Fastened to the channel 55 as by screw studs 59 and insulating washers 60 is a pair of spaced metal plates or blocks 61 and 62 they being further insulated from the channel 55 by an insulator 63. Fastened to the plates 61 and 62 are a plurality of guide studs 64, three being shown for each plate (Figure 12). The studs 64 are adapted to loosely enter co-operative holes 65 in contact members 66 and 67 which are made up of metallic tubing of good current conducting material such as copper and into which a flexible stranded copper cable 68 is inserted and then the whole pressed into a solid rectangular shaped part and on these parts are mounted as by welding, contact blocks 69 and 70. We prefer to apply thereto in a satisfactory manner as by plating, silver areas 71 and 72 of substantial thickness to engage the stationary contacts of the switch. It will be noted from Figure 9 that the parts 66 and 67 have holes therein each to receive a hardened ball 73 which also engages a cooperative seat 74 in members 61 and 62. From this construction it will be seen that the contact members 69 and 70 will be sure to align themselves on the stationary contacts in full and positive engagement. The channel 54 is fastened as by welding to the end of shaft 4 which is supported by a channel 75 and support plate 76 having pairs of arms 77 and 78 extending therefrom and fastened by bolts 79 to the channel 75. Fastened to the shaft 4 by a collar 80 by one or more set screws 81, is a disc 82 preferably integral with the collar 80. The disc 82 has a plurality of toothlike arcuately formed projections 83, one for each of the secondary tap contacts. A roller 84 carried between spacing washers 85 is rotatably carried by a holder 86 that is resiliently held in engagement, between any two of the disc projections, by a spring 87 which is adjustably held under proper tension by nuts 88 carried on a threaded stud 89 fastened to a support arm 90 on the channel 75 that has holes 91 in its opposite sides for assisting in mounting the switch in the casing 1.

The stationary part of the switch is shown in Figure 16 and comprises a plurality, five being shown, of arcuately arranged contacts 92 forming terminals for taps from the secondary of the power transformer as illustrated diagrammatically in Figure 6. The adjacent edges of the contacts 92 have fastened thereto, by counter-sunk screws 93, strips 94 of resistance material such as carbon which are used to reduce the current and arcing and prevent burning of the metal contacts 71 as the shaft 4 is turned. Mounted for co-operative engagement with the contacts 92 is a fixed contact 95 of good conducting material such as copper which is in constant engagement with the movable contact 70—72 and connected to one of the outgoing leads from the secondary of the power transformer 2. The contact surfaces 92 and 95 are all in the same plane and because of the construction of the movable member of the switch excellent contacts are obtained between the movable and stationary parts.

Reference has been made to the projections 83 on the disc 82 of the switch but it may be further mentioned that they are so formed in number corresponding to the number of contact 92, five being used, and the disc so positioned on the shaft 4 and the tension of the spring 87 regulated, that as the shaft 4 is turned, the spring 87 will force the roller 84 over a projection 83 so as to automatically carry the switch contacts 69—71 clear across two adjacent resistance edges 94 without allowing the contacts 69—71 to stop on these edges but will positively move these contacts into engagement with a contact 92.

It will be obvious that many changes may be made in the details involved in the construction of the power units described herein without departing from the spirit of the improvements disclosed and the scope of the appended claims.

What we claim is:

1. Means for electrically operating on a metallic member which includes a plurality of power windings positioned around said member at a part to be operated on and a plurality of segmental regulating windings arcuately positioned alongside the power windings, and a plurality of power supply units arranged in stacked relation, one of said units of a stack having a transformer for supplying current to one of said regulating windings, while at least one of the companion units has a transformer which supplies current to one of said power windings, and means comprising parts of said units for operatively connecting them when the units are stacked together.

2. Means for electrically operating on a metallic member which includes a plurality of power windings positioned around said member at a part to be operated on and an equal number of segmental regulating windings arcuately positioned alongside the power windings, and a plurality of power supply units arranged in stacked relation, one of said units of a stack having a transformer for supplying current to one of said regulating windings, while two of the companion units each has a transformer, the secondaries of which are connected in series and to one of said power windings, means comprising parts of said units for operatively connecting them when the units are stacked together, and means for regulating the voltage of the secondary of each transformer.

3. Means for electrically treating two metallic members that are to be butt-welded together, said means including at least a plurality of power windings arranged in tandem relationship around the adjacent ends of said members, a plurality of power units adapted to be stacked in groups, one above the other, at least each of two units of each group having a power transformer, the secondaries of which are connected in series and to one of said power windings.

4. Means for electrically treating two metallic members that are to be butt-welded together, said means including a plurality of power windings arranged in tandem relationship around the adjacent ends of said members, a segmental regulating winding for each power winding adapted to be arcuately positioned alongside its associated power winding, a plurality of similar power units stacked in groups of three, each unit having a power transformer, the secondary of one unit transformer being connected to a regulating winding, while the secondaries of the other two transformers of the same group are connected in series with the power windings associated with the aforesaid regulating winding, the secondary of each transformer having taps brought out to an adjustable switch connected in circuit with said power winding.

5. Means for electrically treating two metallic members that are to be butt-welded together, said means including a plurality of power windings arranged in tandem relationship around the adjacent ends of said members, a segmental regulating winding for each power winding adapted to be arcuately positioned alongside its associated power winding, a plurality of similar power units stacked in groups of three, each unit having a power transformer, the secondary of one unit transformer being connected to a regulating winding, while the secondaries of the other two transformers of the same group are connected in series with the power windings associated with the aforesaid regulating winding, means for readily interconnecting electrically the said units of each group, each transformer secondary having taps brought out to an adjustable switch so that the voltage of each secondary may be varied over a range of at least two to ten volts.

6. Means for electrically treating two metallic members that are to be butt-welded together, said means including a pair of power windings arranged in spaced relation around said members on each side of their abutting ends, and segmental arcuately formed polarizing coils, one for each of said windings, adjustably positioned outside said windings, a plurality of power units adapted to be stacked one above the other, each unit having an alternating current transformer with its secondary adapted to be connected one of the coils or to one or more of said windings, or two secondaries connected in series with one or more of said windings, depending on the size and character of the members being welded together, and means for regulating the output of said transformers.

7. Means for heat-treating metallic members for a desired purpose, especially in the process of welding parts together, wherein windings are placed so as to inductively act on the parts; said means including a stack of similar units, each unit including a casing carrying an alternating current transformer for supplying power to one or more of said windings, a regulating switch having contacts connected to taps on the secondary of the transformer for determining the power to be delivered therefrom, a control transformer, a contactor and control switches and related parts positioned so when the units are stacked, the parts to be joined are quickly interconnected for increasing the power output as required.

8. Means for heat-treating metallic members for a desired purpose, especially in the process of welding parts together, wherein windings are placed so as to inductively act on the parts, said means including a stack of three similar units, each unit having a continuous capacity of ten to twelve kva or a total of approximately 36 kva or 1200 amperes at 30 volts, with means for varying the voltage from 6 to 30 in two-volt steps, and means including interconnecting circuit members for quickly coupling the units when stacked into a complete working whole.

9. Means for heat-treating metallic members for a desired purpose, especially in the process of welding parts together, wherein windings are placed so as to inductively act on the parts, said means including a stack of similar units, each unit including a casing carrying an alternating current transformer for supplying power to one or more of said windings, a regulating switch having contacts connected to taps on the secondary of the transformer for determining the power to be delivered therefrom, a control transformer a contactor and control switches and related parts positioned so when the units are stacked, the parts to be joined are quickly interconnected for increasing the power output as required, an automatic controller and recorder, and means for quickly coupling the entire stack thereto.

10. For supplying alternating current to windings arranged on pipes for the purposes described, a stack of small, relatively light-weight power supply units including various devices for giving full control of the entire unit, each unit having as part of said devices a hand operated switch to control the current output which is sufficient for energizing one of said windings to heat treat a pipe of small size, such as six inches in diameter and smaller, with means for quickly coupling the units together mechanically and electrically, and further means for regulating the output of the units so pipes of larger diameter may be properly heat-treated.

11. The process of operating on metallic members arranged in abutting relationship which consists in applying a plurality of tandemly arranged windings around the adjacent ends of said members, passing alternating current of a suitable strength through all of said windings to induce heating currents in said ends, then cutting off the current from only the windings nearest to the abutting ends and operating on the joint ends according to the operation required, including arc-welding the joint ends together with all the windings still in position, and then heat-treating the welded joint by turning on and regulating the current in the windings from which the current was removed while the welding was being done.

12. The process of operating on metallic members arranged in abutting relationship which consists in applying a plurality of tandemly arranged windings around the adjacent ends of said members, and also applying segmental heat-regulating coils adjacent each of said windings, passing alternating current of a suitable strength through all the windings and coils to induce heating currents in said ends, then cutting off the current from at least the windings nearest to the abutting ends, and operating on the joint ends according to the operation required, with all the windings still in position, and heat-treating the joint ends by turning back the current into the windings from which it was temporarily removed, and regulating the current in the windings and coils to get the desired result.

13. The process of heat-treating a metallic member which consists in applying a winding around said member, the winding having a varying pitch in its turns, the opposite ends of the winding having a finer pitch, while those turns intermediate the ends have a coarser pitch, passing alternating current through said winding to induce heating currents in said member, and controlling the current so as to attain the desired heat treatment.

14. The process of butt-welding metallic members together which consists in applying a plurality of windings in tandem relationship around adjacent parts of said members, those windings next to the ends of said members having a uniform pitch in their turns, while those windings more remote have a varying pitch, the coarser pitch being toward the windings of uniform pitch, passing alternating current through all of said windings to induce preheating currents in said parts, cutting off the current from only the windings having the uniform pitch turns, arc-welding the joints between the members while all the windings are still in place, and after the weld is completed, turning back the current into said uniform pitch windings and regulating the current in at least the windings having the uniform pitch turns to normalize the weld.

15. The process of butt welding metallic members as set forth in claim 14, further characterized in that segmental regulating coils are positioned outside all of said windings.

16. The process of butt-welding metal members together which consists in bringing the ends of the members into welding position, preheating said ends by establishing, through tandemly spaced windings on opposite sides of the abutting ends of said members, an alternating electromagnetic field around said ends and for a considerable distance away from the ends, then reducing materially the magnetic field directly at the abutting ends of said members, arc-welding the joint between the ends and when the weld is completed then immediately reestablishing and regulating the magnetic field at least over the weld to normalize it.

17. The process of butt-welding metal members as set forth in claim 16, further characterized in that a further step is provided by adding segmental regulating coils that are positioned outside of said windings.

18. Means for electrically treating two metallic members that are to be butt-welded together; said means including a plurality of power windings arranged in tandem around the adjacent ends of said members, a plurality of power units adapted to be stacked in groups, one above the other, each unit having a power transformer with means for connecting the secondaries of the transformers in a relationship with said power windings to meet the demands of said members and their windings.

19. Means for electrically treating two metallic members that are to be butt-welded together; said means including a plurality of power windings arranged in tandem around the adjacent ends of said members, the windings adjacent the area to be welded having a uniform pitch, while the windings more remote have a varying pitch, the ends farthest away from the weld area being of a finer pitch, a plurality of power units adapted to be stacked in a plurality of groups, each unit having a power transformer with means for connecting the secondaries of the transformers in a relationship with said power windings to meet the demands of said member and their windings, and means for regulating the current output of each power transformer.

20. Means for supplying power to windings placed on metallic members for heating them for a desired purpose; said means including a stack of small, relatively light-weight, similar power units, each having, as the major part of its equipment, a power transformer having its secondary connected by a tap-changing switch to one of said windings, a small transformer for furnishing control current for the unit, a contactor having an operating coil for completing a circuit through the primaries of both transformers, a link board for preferably connecting the primaries of the said two transformers to suit the current supply, a four-pole twist lock receptacle to receive a cooperative plug, two interlocks, one at the bottom of the unit, the other behind said four-pole twist lock receptacle and adapted to be operated by a cooperative plug, a start-and-stop control switch, an ammeter for reading at least the full load primary current, and a signal device connected across the contactor coil to show if it is being energized.

21. Means for supplying power to windings placed on metallic members for heating them for a desired purpose; said means including a stack of small, relatively light-weight, similar power units, each having as part of its equipment a power transformer having its primary adapted to be connected to a source of alternating current and its secondary adapted to be connected to one of said windings, the units having means for mechanically and electrically interlocking them to form a complete group or structure capable of supplying the maximum current required for at least one of said windings, means for regulating the output of each unit, and means for simultaneously opening the primaries of all the power transformers in the complete structure should an overload or fault occur in any one of the units of the group or structure.

22. Means for supplying power to windings placed on metallic members for heating them for a desired purpose; said means including a stack of small power units, each unit including as part of its equipment a transformer having its primary adapted to be connected to a source of alternating current, while its secondary is adapted to be connected to one of said windings through a tap-changing switch having a movable member for contacting with different parts or taps of the secondary, and means associated with said switch for preventing said movable member from stopping in a tap-bridging position.

23. Means for supplying power to windings placed on metallic members for heating them for a desired purpose; said means including a stack of small, relatively light-weight, similar power units, each having as part of its equipment a power transformer for supplying current to said windings, a contactor having an operating coil, the contactor acting to complete a circuit through the transformer and at least one of said windings which are of tubing, a fluid relay for controlling the flow of cooling fluid through said tube windings, said relay having means for energizing the coil of said contactor to cause it to operate to thereby open the contactor and cut current off the tube windings should the flow of cooling fluid through the relay stop.

24. Means for supplying power to windings placed on metallic members for heating them for a desired purpose; said means including a stack of small power units, each unit including as part of its equipment a transformer having its primary adapted to be connected to a source of alternating current, the secondary adapted to be connected to at least one of said windings and being made up of a plurality of turns of suitable bar type metal, each turn having a tap out circuit contact adapted to be engaged by a movable switch member, said tap contacts having on adjacent side edges, an insert of material of considerable resistance, such as carbon, for said movable member to temporarily engage as it moves from one of said circuit contacts to the other whereby resistance is introduced into the circuit through the transformer secondary but without opening the circuit as said movable switch member is moved from one tap contact to another.

25. Means for supplying power to windings placed on metallic members for heating them for a desired purpose; said means including a stack of small power units, each unit including as part of its equipment a transformer having its primary adapted to be connected to a source of alternating current, the secondary adapted to be connected to at least one of said windings and being made up of a plurality of turns of suitable bar type metal, each turn having a tap out circuit contact adapted to be engaged by a movable switch member, said tap contacts having on adjacent side edges, an insert of material of considerable resistance, such as carbon, for said movable member to temporarily engage as it moves from one of said circuit contacts to the other to prevent opening the secondary circuit and means associated with the switch member to insure that said member will always stop on a tap contact and not across two of said adjacent resistance inserts as the switch member is moved.

26. Means for supplying power to windings placed on metallic members for heating them for a desired purpose; said means including a stack of small power units, each unit including as part of its equipment a transformer having its primary adapted to be connected to a source of alternating current, the secondary adapted to be connected to at least one of said windings and having taps brought out to arcuately positioned contacts having flat surfaces in the same plane, said contacts having on adjacent side edges, an insert of resistance material, a stationary flat surface switch contact mounted in cooperative position with said arcuately positioned contacts and connected into the secondary circuit, a turnable switch structure having a pair of spaced but interconnected flat surface contacts, one of which is in continuous engagement with said cooperative contact, while the other is adapted to engage said arcuately positioned contacts, and means for turning said turnable switch structure.

27. Means for supplying power to windings placed on metallic members for heating them for a desired purpose; said means including a stack of small power units, each unit including as part of its equipment a transformer having its primary adapted to be connected to a source of alternating current, the secondary adapted to be connected to at least one of said windings and having taps brought out to arcuately positioned contacts having flat surfaces in the same plane, said contacts having, on adjacent side edges, an insert of resistance material, a stationary flat surface switch contact mounted in cooperative position with said arcuately positioned contacts and connected into the secondary circuit, a turnable switch structure including a pair of channel-shaped members, preferably of steel, one channel being of greater width than the other and fastened to a rotatable shaft, the narrower channel having its sides projecting within the sides of the wider channel with means for positioning the narrower channel within the wider one and means for resiliently fastening the two channels together, a pair of locating plates insulatingly mounted in spaced relation on the web of the narrow channel, positioning means on said pair of locating plates, a pair of spaced but flexibly interconnected plate-like contacts mounted on said locating plate positioning means, one of said spaced contacts being in continuous engagement with said co-operative contact while the other is adapted to engage said arcuately positioned contacts and means associated with said shaft for positively positioning the switch structure on said contacts as the shaft is turned.

28. Means for supplying power to windings placed on metallic members as set forth in claim 27 further characterized in that said means associated with the shaft for positively positioning said switch structure includes a disc having accurately formed projections separated by curved depressions, one for each of said arcuately positioned contacts and a roller resiliently and adjustably mounted so in passing over said projections it will automatically move into said depressions as the shaft is turned, the disc being positioned and fastened to the shaft so when the roller passes over a projection it will, in moving into a depression, move the switch contacts into full circuit position.

29. Means for supplying power to windings placed on metallic members as set forth in claim 27 further characterized in that said positioning means on said pair of locating plates includes a plurality of studs fastened to each plate, said interconnected plate-like contacts having holes to loosely receive said studs and each contact plate have a recess therein to receive a ball bearing which also engages its locating plate whereby the plate-like contacts may move to find a maximum surface contact with the stationary switch contacts.

30. Means for supplying power to windings placed on metallic members as set forth in claim 27 further characterized in that said pair of flexibly interconnected contacts includes a flexible stranded conductor having its ends each tightly compressed into rectangular form within a piece of tubing of good conducting material such as copper and rectangular shaped contact blocks securely fastened as by welding to the parts into which the flexible conductor has been anchored, said contact blocks having their face contact faces preferably covered with silver as by plating.

31. The process of welding together two metallic members arranged in abutting relationship which consists in applying two separate windings in tandem around adjacent parts of each member on opposite sides of the abutment where the weld is to be made, passing alternating current of a suitable strength through all of said windings to establish alternating electro-magnetic fields around said parts to first induce preheating currents in said parts, then arc welding the joint parts together with the windings still in position but with the current cut off on only the two windings nearest the joint and then after the weld is completed turning the current back through these two windings from which the current was cut off and heat treating the metal at the weld by regulating the current through at least the last mentioned windings.

32. The process of butt welding two metallic members as set forth in claim 31 further characterized in that a further step is provided by adding segmental regulating coils outside at least one set of said tandemly arranged windings and regulating the current through said coils to obtain the necessary temperature differential between the top and bottom of the two metallic members being welded.

33. The process of butt welding two metallic members as set forth in claim 31 further characterized in that the power is supplied to the windings by a plurality of electrical units arranged in a stack, one unit supplying power for one of said windings and its regulating coil.

HARRY B. SMITH.
GEORGE A. DOLAN.

REFERENCES CITED

The following references are of record in the file of this patent:

UNITED STATES PATENTS

| Number | Name | Date |
| --- | --- | --- |
| 390,911 | Shallenberger | Oct. 9, 1888 |
| 1,201,418 | Achard | Oct. 17, 1916 |
| 1,705,725 | Farley | Mar. 19, 1929 |
| 1,791,934 | Northrup | Feb. 10, 1931 |
| 1,846,030 | Gay | Feb. 23, 1932 |
| 2,000,155 | White | May 7, 1935 |
| 2,101,571 | Breisch | Dec. 7, 1937 |
| 2,166,685 | Henderson et al. | July 18, 1939 |
| 2,184,534 | Smith et al. | Dec. 26, 1939 |
| 2,184,741 | Hartmann | Dec. 26, 1939 |
| 2,395,195 | Roberds | Feb. 19, 1946 |
| 2,457,179 | Ronay | Dec. 28, 1948 |
| 2,468,796 | Wood et al. | May 3, 1949 |